(12) United States Patent
Mori et al.

(10) Patent No.: US 11,402,009 B2
(45) Date of Patent: Aug. 2, 2022

(54) SPROCKET

(71) Applicant: TSUBAKIMOTO CHAIN CO., Osaka (JP)

(72) Inventors: Kaori Mori, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 395 days.

(21) Appl. No.: 16/460,028

(22) Filed: Jul. 2, 2019

(65) Prior Publication Data
US 2020/0063849 A1   Feb. 27, 2020

(30) Foreign Application Priority Data
Aug. 21, 2018 (JP) .............................. JP2018-154688

(51) Int. Cl.
*F16H 55/14* (2006.01)
*F16H 55/30* (2006.01)
*F16H 57/00* (2012.01)

(52) U.S. Cl.
CPC ............ *F16H 55/14* (2013.01); *F16H 55/30* (2013.01); *F16H 57/0006* (2013.01); *F16H 2055/306* (2013.01)

(58) Field of Classification Search
CPC ...... F16H 55/14; F16H 55/30; F16H 57/0006; F16H 2055/306; F16H 7/06; F16H 2007/087; F16H 7/0829; B62M 2009/105; B62M 9/10; B62M 9/02
USPC .......................................................... 474/161
See application file for complete search history.

(56) References Cited

U.S. PATENT DOCUMENTS

| | | | |
|---|---|---|---|
| 10,605,348 B2* | 3/2020 | Gob | F16H 57/0006 |
| 2001/0000171 A1* | 4/2001 | Young | F16H 7/06 474/161 |
| 2009/0118047 A1* | 5/2009 | Haesloop | F16H 55/30 474/161 |
| 2011/0300977 A1* | 12/2011 | Hayami | F16H 55/30 474/161 |
| 2017/0030453 A1* | 2/2017 | Young | F16H 55/30 |
| 2018/0180156 A1* | 6/2018 | Koller | F16H 57/05 |

FOREIGN PATENT DOCUMENTS

JP     2002-523698 A     7/2002

* cited by examiner

*Primary Examiner* — Gene O Crawford
*Assistant Examiner* — Emily Rose Kincaid
(74) *Attorney, Agent, or Firm* — WHDA, LLP

(57) ABSTRACT

In a sprocket including a cushion ring coming into contact with link plates of a chain, the cushion ring includes, on an outer circumferential surface, a plurality of convex sections coming into contact with the link plates, and the plurality of convex sections are provided at corresponding positions to tooth tips at identical pitches to a plurality of teeth and include convex sections having different shapes.

5 Claims, 2 Drawing Sheets

SPROCKET

BACKGROUND OF THE INVENTION

1. Field of the Invention

The present invention relates to a sprocket. In the sprocket, a plurality of teeth engaging with pins, bushes, or rollers of a chain are formed on the circumferential surface of the main body of the sprocket. The sprocket includes a cushion ring on a side surface of the main body, and the outer circumferential surface of the cushion ring is configured to come into contact with link plates of the chain.

2. Description of the Related Art

A chain driving gear that suspends a chain on at least two sprockets on a driving side and a driven side and transmits power has been widely used. In any use of the chain driving gear, it is desirable to reduce a noise level.

In particular, striking sound due to contact of sprocket teeth with and seating of sprocket teeth on pins, bushes, or rollers caused at the start of engaging of the chain with the sprocket is a major factor of noise. Reduction of the noise is required for chain driving gears.

There is another problem due to the impact caused by the contact of pins, bushes, or rollers with or seating of pins, bushes, or rollers on sprocket teeth at the start of engaging of the chain with the sprocket. Such impact causes vibration, and may lead to breakage or wear of chains and sprockets and reduces durability of the chain and the sprocket.

A device developed for reducing such an impact and striking sound due to the contact and the seating at the time of engagement between the chain and the sprocket has been known. Such a device includes a plurality of teeth engaging with pins, bushes, or rollers of a chain are formed on the circumferential surface of the main body of the sprocket. The sprocket includes a cushion ring on a side surface of the main body, and the outer circumferential surface of the cushion ring is configured to come into contact with link plates of the chain. The impact and the striking sound caused at engagement are reduced by configuring the device such that the link plates come into contact with the outer circumferential surface of the cushion ring before the pins, the bushes, or the rollers of the chain come into contact with or are seated on the teeth of the sprocket.

Usually, when the sprocket engages with a roller chain in which a large number of inner link plates and a large number of outer link plates are alternately coupled by coupling pins, intermediate portions in the chain longitudinal direction of the link plates are located closest to the center of the sprocket in a state where the chain is wound on the sprocket.

Therefore, in the cushion ring, portions in contact with the intermediate portions in the chain longitudinal direction of the link plates on the outer circumferential surface, that is, portions corresponding to tooth tips of the plurality of teeth in the circumferential direction come into contact with the link plates most strongly and are greatly elastically deformed.

A sprocket developed for adjusting this elastic force and controlling a contacting state of the rollers and the sprocket at engagement has also been known (see, for example, Japanese entire figures)). In this sprocket, grooves are provided on the outer circumferential surface of a cushion ring at equivalent pitches as the pitches of teeth of the sprocket, and an outer circumferential surface between the grooves of the cushion ring is formed as a surface inclined with respect to a circumferential surface.

SUMMARY OF THE INVENTION

The cushion ring of the sprocket publicly known in Japanese Translation of PCT Application No. 2002-523698 and the like repeats compressed deformation due to contact with the link plates of the chain and release and return to the original state after separation off the link plates of the chain when the cushion ring rotates while the chain is set on the cushion ring.

Greatly-deforming portions on the cushion ring, which are deformed by strong pressure from the link plates, in the region pressed by the inner link plates and in the region pressed by the outer link plates are shifted to the different positions in the width direction of the cushion ring for each of the teeth.

In general, chains with inner link plates and outer link plates, the shapes, heights, and thicknesses of which are different from each other, have often been used. Thus, a deformation amount of the cushion ring and timing of contact are different for each of the teeth between in the regions pressed by the inner link plates and in the regions pressed by the outer link plates of the cushion ring.

Therefore, reaction forces applied from the cushion ring to the link plates are different between in the regions pressed by the inner link plates and in the regions pressed by the outer link plates. Although the impact and the striking sound due to the contact and the seating at engagement of the cushion ring with the chain decrease, vibration, resonance, and the like of the chain are caused because two types of reaction forces alternately appear at an equal interval, which may cause vibration and noise in the entire chain driving gear.

The present invention is made to solve the problems of the conventional art explained above. That is, an object of the present invention is to provide a sprocket that reduces an impact and striking sound due to contact and seating at engaging of the sprocket with a chain, reduces vibration and noise in the entire chain driving gear, and improves durability.

The present invention provides a sprocket including: a plurality of teeth that is formed on a circumferential surface of the sprocket and is configured to engage with pins, bushes, or rollers of a chain; and a cushion ring provided on at least one side surface of the sprocket and having an outer circumferential surface configured to come into contact with link plates of the chain, wherein the cushion ring includes, on the outer circumferential surface, a plurality of convex sections configured to come into contact with the link plates, and the plurality of convex sections are provided at corresponding positions to tooth tips at identical pitches to the plurality of teeth and include convex sections having different shapes. Consequently, the present invention solves the problems.

In the sprocket of the invention according to an aspect of the invention, the cushion ring includes, on the outer circumferential surface, the plurality of convex sections in contact with the link plates. Therefore, it is possible to reduce an impact and striking sound due to contact and seating at the time of engagement of the sprocket with a chain.

In this sprocket, the convex sections are provided in portions corresponding to the tooth tips at identical pitches to the plurality of teeth and include the convex sections having different shapes. With this configuration, it is possible to set reaction forces applied from the cushion ring to the link plates to be the same between in regions pressed by inner link plates and in regions pressed by outer link plates or to be a three or more different types of reaction forces. As a result, it is possible to avoid the occurrence of two different types of reaction forces alternately appearing at an equal interval, to reduce occurrence of vibration and noise of the entire chain driving gear, and to improve durability.

With the configuration according to another aspect of the invention, the plurality of convex sections are configured of the first convex sections and the second convex sections that are different from each other in shapes thereof, and the first convex sections and the second convex sections are alternately disposed in the circumferential direction of the cushion ring. With this configuration, it is possible to respectively form the convex sections in optimum shapes for reducing an impact and striking sound due to contact with and seating on the inner link plates and the outer link plates alternately disposed in the chain longitudinal direction. It is possible to equalize reaction forces and wind the chain in a form for suppressing vibration and resonance of the chain. It is possible to further reduce occurrence of vibration and sound of the entire chain driving gear and improve durability.

With the configuration according to another aspect of the invention, even when the heights of the inner link plates and the outer link plates are different from each other, it is possible to set timing of a contact start to the same timing in the inner link plates and the outer link plates by differentiating the heights of the first convex sections and the second convex sections according to the heights of the inner link plates and the outer link plates. It is possible to suppress vibration due to a difference in timing of the contact.

With the configuration according to another aspect of the invention, even when the shapes and the thicknesses of the inner link plates and the outer link plates are different, it is possible to respectively optimize contact states of the first convex sections and the second convex sections, to further reduce occurrence of vibration and noise of the entire chain driving gear, and to improve durability.

With the configuration according to another aspect of the invention, the interference amount at the time of seating between the first convex sections and the inner link plates of the chain is equal to the interference amount at the time of seating between the second convex sections and the outer link plates of the chain. With this configuration, even when the heights of the inner link plates and the outer link plates are different, it is possible to equalize reaction forces applied from the cushion ring to the link plates and to suppress vibration due to a difference in reaction forces between the inner link plates and the outer link plates.

DESCRIPTION OF THE PREFERRED EMBODIMENT

The present invention may be embodied specifically in any form as long as it is a sprocket, including a plurality of teeth that is formed on a circumferential surface of the sprocket and is configured to engage with pins, bushes, or rollers of a chain; and a cushion ring provided on at least one side surface of the sprocket and having an outer circumferential surface configured to come into contact with link plates of the chain, wherein the cushion ring includes, on the outer circumferential surface, a plurality of convex sections configured to come into contact with the link plates, and the plurality of convex sections are provided at corresponding positions to tooth tips at identical pitches to the plurality of teeth and include convex sections having different shapes.

The main body and teeth of the sprocket of the present invention may be made of any material such as metals (e.g. steel), ceramics, or resins, or may be made of a composite material of such metals, ceramics, and resins.

The cushion ring of the sprocket of the present invention may be made of any material such as rubbers or synthetic resins as long as the cushion ring keeps elasticity and sound of contact with a chain can be reduced.

Embodiment 1

Figure 1:
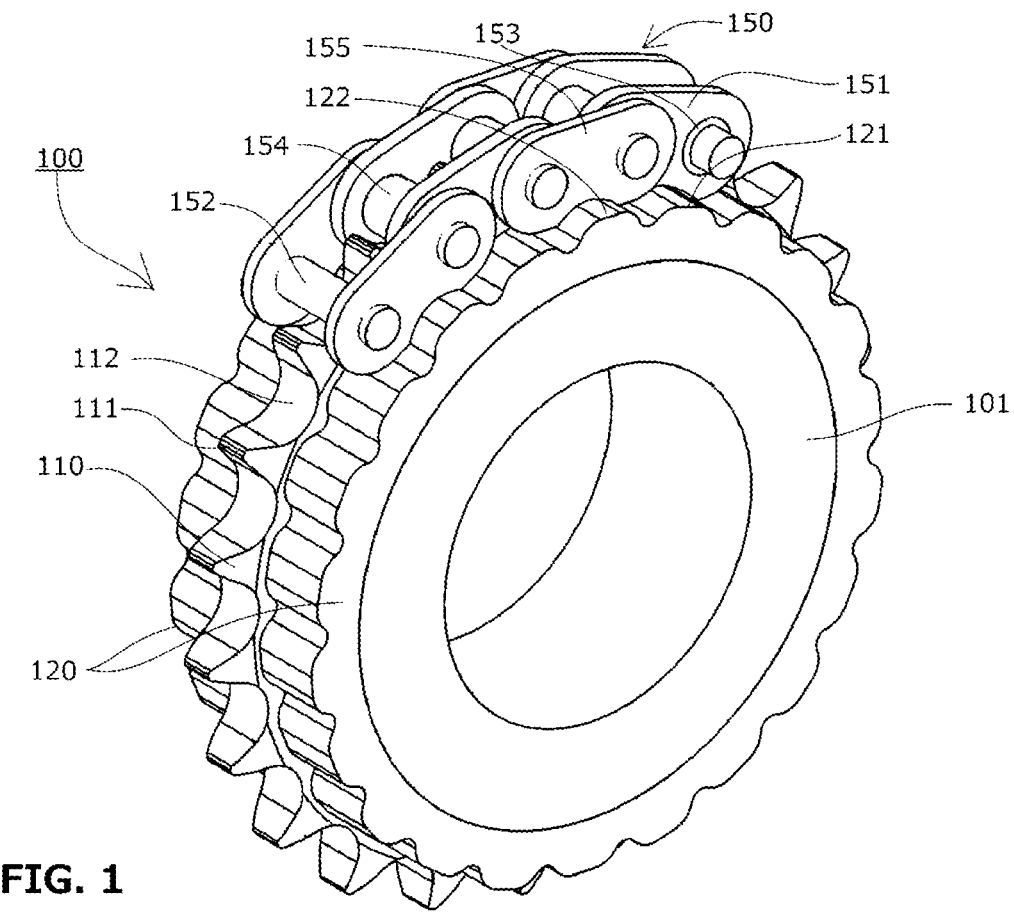
FIG. 1 is a perspective view of a sprocket and (a part of) a chain according to a first embodiment of the present invention.
Figure 2:
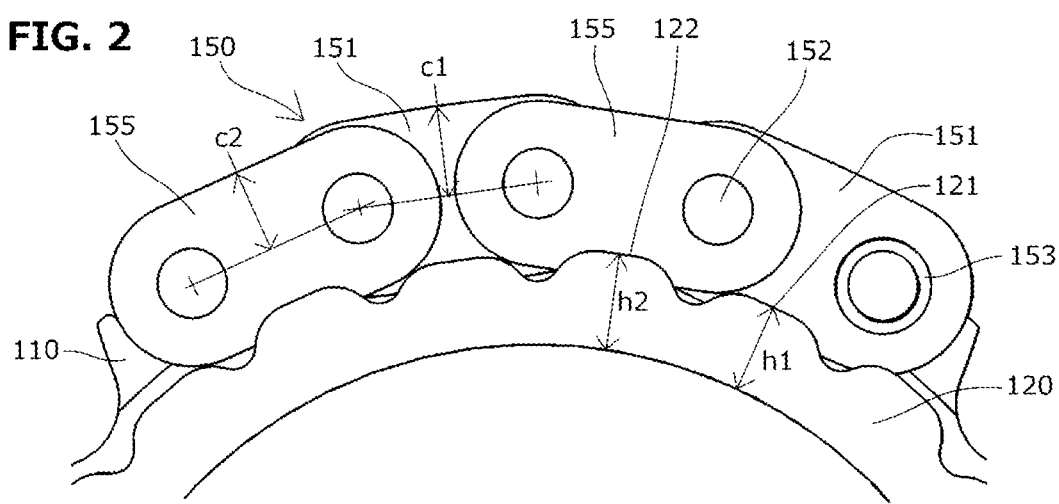
FIG. 2 is an explanatory diagram of the sprocket and (the part of) the chain shown in FIG. 1.

A sprocket 100 according to a first embodiment of the present invention includes, as shown in FIGS. 1 and 2, a sprocket main body 101, on the circumferential surface of which a plurality of teeth 110 including tooth tips 111 and teeth bottoms 112 are formed, and cushion rings 120 that is made of an elastic member and is provided on both side surfaces of the sprocket main body 101. The outer circumferences of a cushion ring 120 comes into contact with the link plates of the chain.

First convex sections 121 and second convex sections 122 are alternately provided in the circumferential direction in the outer circumferences of the cushion rings 120 on both the side surfaces. They are formed so that the centers of the first convex sections 121 and the second convex sections 122 be located at corresponding positions to the tooth tips 111.

Herein, the term "corresponding positions" in the circumferential direction refers to positions having identical angles in the circumferential direction of the sprocket 100.

In this embodiment, the surfaces of concave sections between the first convex sections 121 and the second convex sections 122 are formed to be continuous smooth wavy curved surfaces.

A chain 150 is wound around the sprocket 100 (in FIG. 1, only a part of the chain 150 is shown).

The chain 150 is a common roller chain. The chain 150 includes a pair of inner link plates 151 into which a bush 153 fits, a pair of outer link plates 155 into which a coupling pin 152 fits, and a roller 154. The coupling pin 152 is loosely fit on the inner surface of the bush 153, whereby the outer link plates 155 and the inner link plates 151 are alternately bendably coupled. The roller 154 is loosely fit on the outer surface of the bush 153.

As shown in FIG. 2, a diameter of a hole through which the the bush 153 fits into the inner link plate 151 is larger than a diameter of a hole through which the coupling pin 152 fits into the outer link plate 155. For securing tensile strength, the inner link plate 151 is formed such that the height c1 of the inner link plate 151 is formed larger than the height c2 of the outer link plate 155.

Correspondingly, the thickness h1 of the first convex section 21 of the cushion ring 120 that comes into contact with the inner link plate 151 is formed smaller than the thickness h2 of the second convex section 122 of the cushion ring 120 that comes into contact with the outer link plate 155.

With this configuration, it is possible to substantially match the timing of contact between the inner link plate 151 and the first convex section 121 at the start of engagement with the timing of contact between the outer link plate 155 and the second convex section 122, which enables suppress vibration due to a difference between the timings of the contacts.

Embodiment 2

A sprocket according to a second embodiment of the present invention has the same configuration as the sprocket according to the first embodiment except that the cushion ring 120B is installed.

Figure 3:
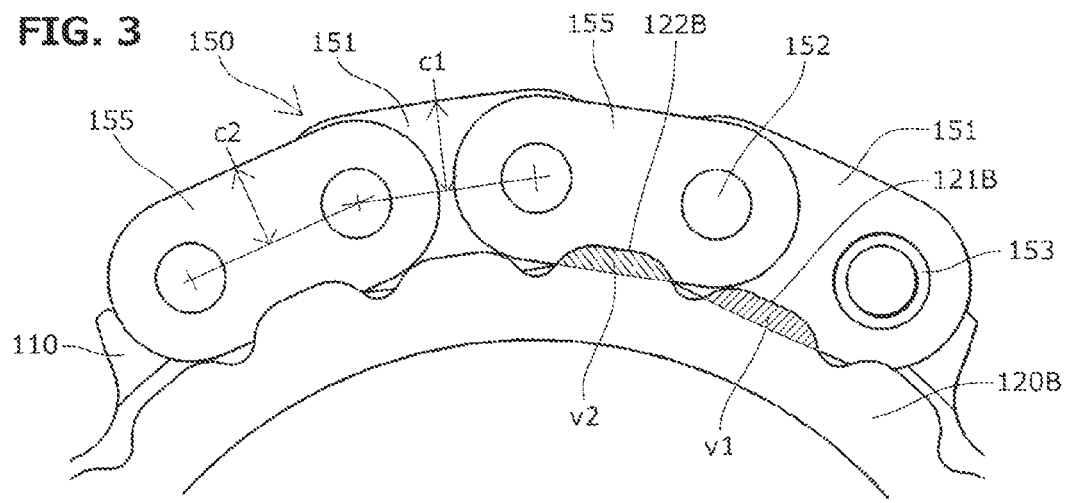
FIG. 3 is an explanatory diagram of a sprocket and (a part of) a chain according to a second embodiment of the present invention.

The cushion ring 120B of the sprocket according to the second embodiment is formed such that, as shown in FIG. 3, an interference amount (volume) v1 between a first convex section 121B and the inner link plate 151 be equal to an interference amount (volume) v2 between a second convex section 122B and the outer link plate 155 at the time when the chain 150 is seated.

With this configuration, even when the heights of the inner link plate 151 and the outer link plate 155 are different, it is possible to equalize reaction forces applied from the cushion ring 120B to the link plates and to suppress vibration due to a difference in reaction forces between the inner link plate 151 and the outer link plate 155.

Embodiment 3

Figure 4:
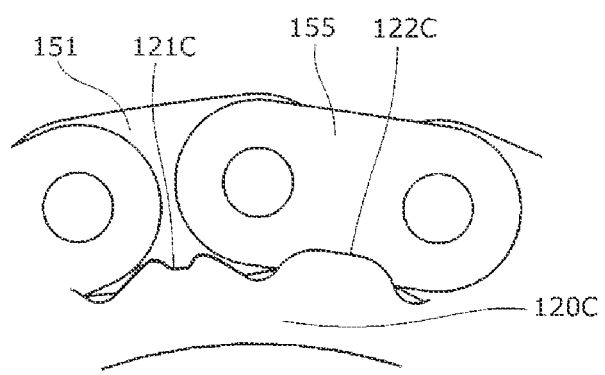
FIG. 4 is an explanatory diagram of a sprocket and (a part of) a chain according to a third embodiment of the present invention.

As shown in FIG. 4, a sprocket according to a third embodiment of the present invention has the same configuration as the sprocket in the first or second embodiment except that the cushion ring 120C is installed.

The cushion ring 120C of the sprocket according to the third embodiment is formed such that the shape of a first convex section 121C to which the inner link plate 151 interferes be different from a shape of a second convex section 122C to which the outer link plate 155 interferes Embodiment 4

Figure 5:
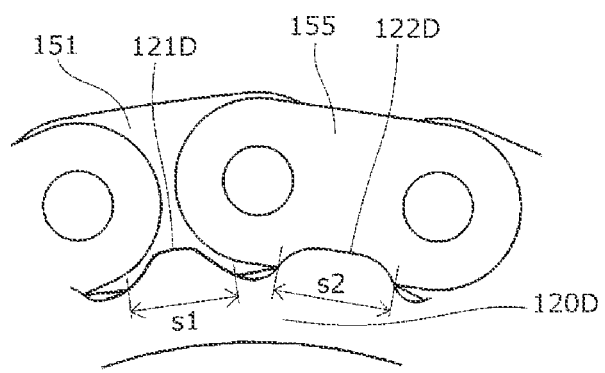
FIG. 5 is an explanatory diagram of a sprocket and (a part of) a chain according to a fourth embodiment of the present invention.

As shown in FIG. 5, a sprocket according to a fourth embodiment of the present invention has the same configuration as the sprockets in the first to third embodiments except that the cushion ring 120D is installed. The cushion ring 120D of the sprocket in the fourth embodiment is formed such that the circumferential direction length s1 of a surface coming into contact with a first convex section 121D to which the inner link plate 151 interferes be different from the circumferential direction length s2 of a surface coming into contact with a second convex section 122D to which the outer link plate 155 interferes (i.e., areas of the surfaces coming into contact with the convex sections are also different).

In this embodiment, a shape of the first convex section 121D to which the inner link plate 151 interferes and a shape of the second convex section 122D to which the outer link plate 155 interferes are also different, similarly to the third embodiment.

As explained above, the sprocket of the present invention has very great effects of, for example, reducing an impact and striking sound due to contact at the time of engagement of the sprocket with the chain, reducing an impact and striking sound due to contact and seating at the time of engagement of the sprocket with the chain, and reducing vibration and noise in the entire chain driving gear and improve durability.

The invention claimed is:

1. A sprocket, comprising:
a plurality of teeth that are formed on a circumferential surface of the sprocket and are configured to engage with pins, bushes, or rollers of a chain; and
a cushion ring provided on at least one side surface of the sprocket and having an outer circumferential surface configured to come into contact with link plates of the chain, wherein
the cushion ring includes, on the outer circumferential surface, a plurality of convex sections configured to come into contact with the link plates,
the plurality of convex sections are provided at corresponding positions to tooth tips at identical pitches to the plurality of teeth and include convex sections having different shapes,
the plurality of convex sections includes first convex sections and second convex sections, the first convex sections and the second convex sections having the different shapes from each other,
the first convex sections and the second convex sections are alternately disposed in a circumferential direction of the cushion ring, and
an interference volume at a time of seating between the first convex sections and the inner link plates of the chain is equal to an interference volume at the time of seating between the second convex sections and the outer link plates of the chain, the interference volume being an amount of volume of a displacement of the respective convex sections at the time of seating of the chain.

2. The sprocket according to claim 1, wherein the first convex sections are different from the second convex sections in heights in a radial direction of the cushion ring.

3. The sprocket according to claim 1, wherein the first convex sections are different from the second convex sections in shapes of surfaces that are configured to come into contact with the link plates.

4. The sprocket according to claim 1, wherein the first convex sections are different form the second convex sections in areas of surfaces that are configured to come into contact with the link plates.

5. The sprocket according to claim 1, wherein the first convex sections are different from the second convex sections in circumferential direction lengths of surfaces that are configured to come into contact with the link plates.

* * * * *